United States Patent [19]

Heijne et al.

[11] 3,907,657

[45] Sept. 23, 1975

[54] GAS ANALYSIS APPARATUS

[75] Inventors: Leopold Heijne; Nicolaas Marinus Beekmans; Petrus Jacobus Poolman; Ronald Karel Eijnthoven, all of Eindhoven, Netherlands

[73] Assignee: U.S. Philips Corporation, New York, N.Y.

[22] Filed: Aug. 29, 1973

[21] Appl. No.: 392,682

[30] Foreign Application Priority Data

July 9, 1973  Netherlands..................... 7309537

[52] U.S. Cl............ 204/195 S; 204/1 T; 123/119 E
[51] Int. Cl. ........................................... G01n 27/46
[58] Field of Search....... 204/1 T, 195 S; 123/119 E

[56] References Cited
UNITED STATES PATENTS

| | | | |
|---|---|---|---|
| 3,162,585 | 12/1964 | De Ford et al.................. | 204/195 T |
| 3,282,803 | 11/1966 | Poepel et al. ....................... | 204/1 T |
| 3,328,277 | 6/1967 | Solomons et al................ | 204/195 P |
| 3,400,054 | 9/1968 | Ruka et al. ...................... | 204/195 S |
| 3,514,377 | 5/1970 | Spacil et al........................... | 204/1 T |
| 3,654,112 | 4/1972 | Beekmans et al. .............. | 204/195 S |
| 3,661,724 | 5/1972 | Strickler........................ | 204/195 W |
| 3,698,384 | 10/1972 | Jones.............................. | 204/195 S |
| 3,727,058 | 4/1973 | Schrey............................ | 204/195 S |
| 3,768,259 | 10/1973 | Carnahan et al. ............... | 204/195 S |

*Primary Examiner*—T. Tung
*Attorney, Agent, or Firm*—Frank R. Trifari; Bernard Franzblau

[57]  ABSTRACT

Concentration measurements of gaseous components are possible by means of a sampling method, in which a measuring space of known volume is brought to the concentration level to be measured via a connecting means having a high transfer resistance, after which the gaseous component is rapidly removed from the measuring space. Removal of the gaseous component is effected by means of a partition, forming part of a wall section of the measuring space, in which ionic conduction takes place. The required charge, which is applied to the partition, is a measure of the concentration to be determined.

16 Claims, 5 Drawing Figures

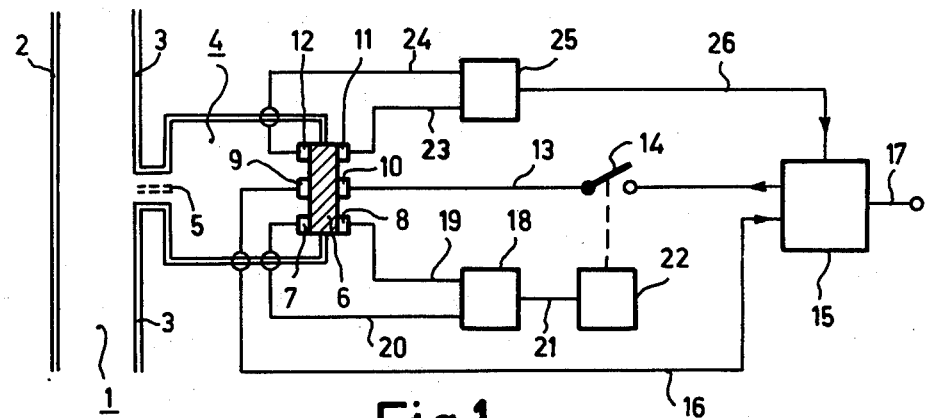
Fig.1
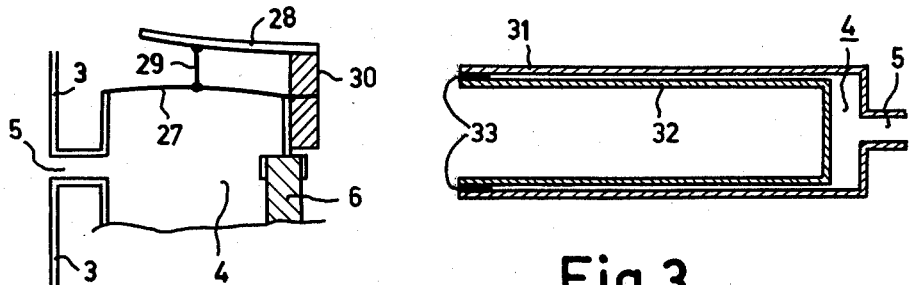
Fig. 2
Fig. 3
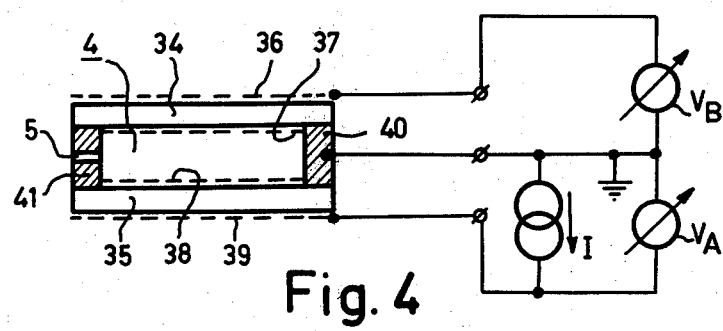
Fig. 4
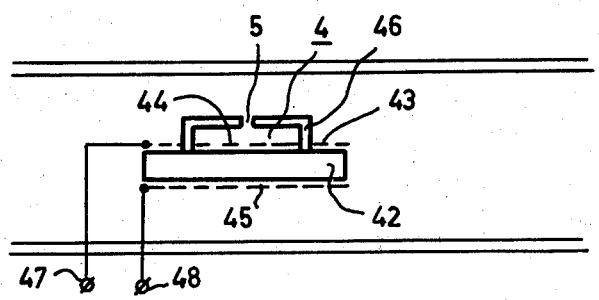
Fig. 5

GAS ANALYSIS APPARATUS

The invention relates to a gas analysis apparatus for measuring the concentration of a gaseous component in a first space, said apparatus comprising a measuring space which receives a measuring sample from the first space, and a partition which is part of a wall section of the measuring space and consists of at least one solid substance which exhibits ionic conduction, said partition being provided with at least one electrode layer on both sides, inter alia for the application of an electric current, so that the gaseous component is removed from the measuring space by means of a current of ions.

It is known to measure or to dose a gas by means of a partition. The substance or the mixture of substances comprising said partition is selected so as to permit the migration of certain ions in the substance in a specific temperature range under the influence and in the direction of an electric field. Moreover, the said ions may enter into reversible reactions with molecules which are located outside the partition. Thus, a gas can be transferred from the one space through the partition to another space or at the electrode layers potential differences can be measured which are a measure of the partial differences in pressure.

An example is the measurement of partial pressures of halogens by means of a partition of a silver halide. A constant reference pressure can be obtained by using a silver electrode at the reference side. Further, such a silver halide partition, specifically silver iodide, can be rendered suitable for measuring sulphur pressures by applying a layer of silver sulphide onto the said partition.

By means of additives, zirconium oxide can be rendered suitable for measuring or dosing oxygen. Preferably, both sides of the partition are coated with a porous layer of platinum, which serves as an electrode.

U.S. Pat. No. 3,514,377 comprehensively described how various arrangements can be used to measure oxygen in a gaseous mixture, oxygen can be removed from a gaseous mixture and oxygen can be dosed, for example for burning a combustible mixture.

FIG. 7 of said United States Patent and the associated description reveal that a gaseous sample, which is isolated in a measuring space, can be analyzed by means of a partition which acts as a pump, oxygen transport taking place through the partition. Thus, oxygen is removed from the measuring space or oxygen reacts with a combustible mixture. In this way the concentration of a gaseous component, such as oxygen or a combustible mixture, can be measured by current and voltage measurements with the aid of electrode layers located on the partition.

The description of the said Patent, particularly column 6, lines 56 and further, and columns 7 and 8, in conjunction with FIG. 8, reveals how concentration measurements can be performed with constant pumping currents by time measurements and the detection of voltage changes.

It is an object of the invention to improve the known method of measuring gaseous samples, embodiments of both the gas sampling and of the methods of measuring the concentration of the gaseous component being described.

According to the invention a gas analysis apparatus as described hereinbefore is characterized in that between the first space and the measuring space a connecting means presenting a high transfer resistance is interposed, which in a filling time $t_r$ brings the ratio of the concentrations of the gaseous component in the two said spaces to substantially unity by diffusion. The apparatus further comprises a control unit for the electric current which after at least the filling time switches on the current during a pumping time $t_p$ so that the gaseous component in the measuring space is substantially completely removed whereby the ratio of the concentrations in the two spaces becomes substantially zero.

The advantage of a gas analysis apparatus according to the invention is that no mechanically moving parts are used, such as valves or cocks, as is the case in the embodiment described in said United States Patent.

A further advantage is that by the choice of the filling time $t_r$, the dimensions of the connecting means do not affect the measuring result. Consequently, some measure of contamination is permissible. As a result, the dimensions of the flow passages will change or generally the diffusion rate will decrease. However, allowance can be made for this in determining the filling time $t_r$.

An advantage of the apparatus according to the invention is also that a slight leakage through the walls is permissible, so that especially at high temperatures the sealing problems are mitigated. The concept underlying the invention is based on the very fact that during the pumping time $t_p$ the measuring space is to be emptied rapidly as regards the gaseous component to be measured and that subsequently the measuring space may be refilled in a considerably longer time. The inflow of the gaseous component during emptying is so low that a satisfactory null detection is attainable, so that the ratio of the concentrations inside and outside the measuring space is substantially zero.

The known advantages are: the response is linear, no reference atmosphere is required and a substantial detection signal is obtained, which for example may be of the order of magnitude of 1 volt.

A suitable application of the apparatus may be found in the analysis of the exhaust gases of combustion engines where the measuring space is exposed to contamination and high temperatures. The measuring signal of such a gas analysis apparatus can be used in a control system by means of which the engine air-fuel ratio can be optimized.

Moreover, it has been found that for such an application an oxygen measuring cell operating in accordance with the known principle of EMF-measurement using Nernst's law may be less suitable, because at a minimum of air pollution and optimum combustion the percentage of oxygen in the exhaust gases may be fairly high, for example 5%, the reference atmosphere being air with an oxygen content of 20% which means that according to Nernst the resultant EMF is fairly small (millivolts) owing to the logarithmic character. Interference voltages and thermal voltages then become predominant. A gas analysis apparatus according to the invention does not have said drawback.

The connecting means may be an opening in the wall of the measuring space, or several parallel openings of smaller diameter. A porous plug or a porous filter element is extremely suitable. It is also possible to use one or more capillaries which can be suitably dimensioned as regards cross-section and length so as to obtain the correct flow resistance.

In still further embodiments a semipermeable membrane may be used whose diffusion or permeability constant in conjunction with the dimensions of the membrane determines the rate of transfer. Silicon rubbers, polytetrafluoroethylene or specific metals such as palladium for hydrogen and silver for oxygen may be used, depending on operating temperature and permeability to gas. For example, in one embodiment a connecting means is used which is made of the same substance as the said partition. By electrically interconnecting the electrode layers said connecting means, by way of ion transport, tends to set the same concentration of the relevant gaseous component both at the one side, situated in the first space, and at the other side, situated in the measuring space.

As in some processes it is impracticable to observe long waiting times, embodiments according to the invention, in conjunction with the embodiments described hereinbefore, include electronic means capable of rapidly performing the desired control operations and measurements. The control unit in the gas analysis apparatus should comprise a timing circuit which blocks the measurement during at least the filling time $t_r$ and which subsequently starts the measurement, after which this is terminated again as soon as a detector has ascertained that the gaseous component has been removed from the measuring space. To those skilled in the art it will be known how to realize blocking functions and repetitive or non-repetitive timing functions in a simple manner using electronic means.

The partition itself may be used as a detector to determine that the gaseous component has been removed from the measuring space. At that instant a voltage variation occurs, which can be measured at the electrode layers, such that a stop signal can be obtained which terminates the measurement through level detection with a threshold value or by differentiation. If measured at the same electrode layers to which the electrical pumping current is applied, such a detection circuit may include compensation means to compensate for the IR voltage drop across the cell for a level detector.

As the basic measurement is a charge measurement, charge sources may be used, such as charged capacitors, the difference voltage before and after the measurement representing the measuring quantity. Also, constant current sources may be used with a time measurement, or known, small charge doses may be applied, the number of applied doses representing the measuring quantity.

In these embodiments it is also advantageous that a temperature independent measurement can be obtained by making the charge measurement inversely proportional to the absolute temperature either by controlling the current sources with a signal derived from a transducer in the measuring space or by thus controlling a measuring time-base, for example a clock frequency.

Another alternative according to the invention is to provide the measurement space with such materials that the volume is directly proportional to the temperature, i.e. at least for the operating range.

The invention will now be described in more detail with reference to the drawing, in which:

FIG. 1 schematically represents a gas analysis apparatus according to the invention, FIG. 2 is an embodiment of the measuring space according to the invention, FIG. 3 is a different embodiment of the measuring space, FIG. 4 is an embodiment with separate measuring circuits, and FIG. 5 is an embodiment of a measuring space mounted in the exhaust pipe of a combustion engine.

FIG. 1 shows a gas analysis apparatus according to the invention in which the blocks represent electronic means which are assumed to be known to those skilled in the art, so that a further description is dispensed with. A first space 1, which is bounded by walls 2 and 3, contains a mixture of gases, of which one component, which consists of one sort of gas or of a mixture of certain gases, is to be measured in concentrated form. An enclosed measuring space 4 communicates with the first space 1 via a connecting means 5. The transfer resistance of the connecting means 5 is selected so that when the space 4 is almost empty there is a filling time $t_r$ in which, through diffusion, the concentration of the gaseous component to be measured attains substantially the same value as the concentration of the gaseous component in the first space 1. For the connecting means 5 one opening or several parallel openings may be chosen, or one or several narrow channels or capillaries, or a porous wall section or a semipermeable membrane.

A part, if required the greater part, of the walls of the measuring space 4, consists of a partition 6, for example stabilized zirconium oxide, which exhibits ionic conduction for oxygen. Said partition is provided with electrode layers at both sides which are porous and which are applied as a continuous layer or as electrically isolated layers at either side. In FIG. 1 a layer 7, 9 and 12 is provided at the inside of the measuring space which cooperates with a layer 8, 10 and 11 respectively at the outside of the measuring space. The electrode layer 10 is connected by a connection 13 via a switch 14, having a symbolically represented switching function, to a charge source 15, which by a connection 16 is connected to the electrode layer 9 via passages in the wall of the measuring space. When the switch 14 is closed the charge source 15 supplies a charge to the partition 6 by means of an electrical current. Said charge is measured in the source 15 and is a measure of the concentration of the gaseous component to be measured in the measuring space 4. At an output 17 a measuring signal is available which is proportional to the gas concentration. A detection circuit 18 is connected by a connection 19 to electrode layer 8 and by a connection 20 to electrode layer 7. When the concentration of the gaseous component to be measured in the measuring space has become very low, a sufficiently large signal is available at these layers 7 and 8 to cause the detection circuit to supply a stop signal via a connection 21 to a starting and blocking unit 22, which actuates the switch 14.

The connection 19 may be combined with connection 13, and the connection 20 with connection 16, because it is also possible to obtain an adequate detection signal across the electrode layers 9 and 10. Instead of using a thermocouple, a temperature measurement, if required, may also be performed in the measuring space by means of electrode layers 11 and 12 which, via connections 23 and 24, are connected to a temperature measuring circuit 25.

The negative temperature coefficient of the partition is then used for the temperature measurement. A signal for controlling the charge measurement in unit 15 is applied from the temperature measuring device 25 to the unit 15 via a connection 26. When the unit 22 closes the switch 14 ions will migrate in the partition between the electrode layers 9 and 10 and these ions enter into reactions at the surface of the partition, for example in the case of zirconium oxide, oxygen is transferred from the outside of layer 10 to the measuring space so as to obtain combustion of the combustible components to be measured. Conversely, in the case of reverse current control from the charge source 15 oxygen is extracted from the measuring space 4 and is released at the outside of the measurement space.

The charge may be supplied by discharging capacitors, by constant current sources or by pulse-shaped currents. In the method of discharging capacitors the voltage difference before and after the measurement represents the measuring value, in the case of constant current sources a time measurement is performed and in the case of pulse-shaped currents the number of pulses can be counted.

The end of the measurement can be detected in the detection circuit 18 by, for example, differentiating the voltage variation at the electrode layers 7 and 8 or 9 and 10.

By correcting the measuring result in respect of the temperature in the measuring space the measurement of the concentration of the gaseous component can be rendered temperature independent.

FIG. 2 shows a mechanical correction for the temperature. A part of the measuring space 4 of FIG. 1 is shown, the connecting means 5 being a narrow capillary.

A wall portion 27 is made of a gastight, movable material which can be moved by a bimetal 28, which through a rigid connection 29 is connected to wall portion 27. The bimetal 28 is firmly clamped in a member 30 which is connected to the wall of the measuring space. If care is taken that the bimetal has the same temperature as the gas in the space 4, the dimensions of the parts 28, 29 and 27 may be selected so that in the temperature range in which gas analysis is to take place, the volume of the measuring space is directly proportional to the absolute temperature T in degrees Kelvin.

FIG. 3 shows an alternative solution to make the volume of the measuring space 4 proportional to T. In this figure the measuring space 4 with connecting means 5 is symbolically represented. The wall 31 has a coefficient of linear expension as a function of temperature such that, in conjunction with the wall 32, a piston action is obtained. This is because the parts 31 and 32 are mechanically coupled by connecting pieces 33. The coefficient of expansion of the wall 32 differs from that of the wall 31 in such a way that the volume of the measuring space 4 can be made directly proportional to the absolute temperature.

In FIG. 4 the measuring space 4 is for the greater part enclosed by a partition 34 and a partition 35. The partition 34 comprises an electrode layer 36 on the outside and an electrode layer 37 on the inside of the measuring space. The latter is mechanically and electrically connected through connecting pieces 40 and 41 to the electrode layer 38 of the partition 35 which on the outside is provided with an electrode layer 39. The connecting piece 41 has the narrow opening 5 for the supply of measuring gas from the surrounding space. A current source I supplies a charge to the partition 35 for extracting the gaseous component from the measuring space. A voltmeter $V_A$ monitors the voltage variation and so does a voltmeter $V_B$.

The first voltmeter $V_A$ is included between the layers 38 and 39, the second voltmeter $V_B$ being included between the layers 36 and 37.

The voltage variation, as previously described, occurs when the partition 35 has reduced the concentration of the gaseous component in the measuring space to substantially zero owing to the applied charge and its ionic conduction, which in practice means that the ratio of the concentrations inside and outside the measuring space has been reduced to substantially zero.

FIG. 5 shows an application of a gas analysis apparatus in the exhaust pipe of a combustion engine. The partition 42 is provided with an electrode layer 43 with an active portion 44 in the measuring space 4. The other electrode layer of the partition 42 is designated by 45. The measuring space 4 has a flow passage 5 in a wall 46. The layer 43 is connected to a terminal 47 and the layer 45 to a terminal 48, which permits the measuring charge to be applied from outside the exhaust pipe and which also permits the voltage transient across the layer to be measured after the pumping time $t_p$, as described hereinbefore. Via these terminals 47 and 48 it is also possible, by using suitable detection means, to obtain information about the temperature in the measuring space 4, for example by measuring the resistance of the partition 42 and processing the measuring result during the charge measurement. It will be obvious that the embodiment of FIG. 5 can be very simple because, for example, the layer 43 can be interconnected to the ground of the combustion engine via a suitable holder which accommodates the assembly, so that only a single measuring lead or an insulated metal tube need be provided to terminal 48.

It is to be noted furthermore, that it is evident from the embodiments of FIGS. 4 and 5, that the first space intended in the Application may completely surround the measuring space in contradistinction to the embodiment of FIG. 1, where pumping takes place to or from a third space.

What is claimed is:

1. A gas analysis apparatus for measuring the concentration of a gaseous component in a first space comprising, a chamber having wall means that define a measuring space which receives a measuring gas sample from the first space via connecting means that presents a high gas flow transfer resistance, said wall means including a partition which is part of a wall section of the measuring space and comprising at least one solid substance exhibiting ionic conduction, first and second electrode layers affixed to opposite sides of said partition for receiving an electric current, so that by means of a current of ions in the partition the gaseous component is removed from the measuring space, a control unit for applying an electric current to said first and second electrodes during a pumping time $t_p$ and including means for interrupting the flow of current to said electrodes during a filling time $t_v$, the transfer resistance of said connecting means being chosen so that, owing to diffusion, the ratio of the concentrations of the gaseous component in the said two spaces is brought to a substantially unity value during the filling time, and the control unit for the electric current further comprises means for applying an electric current to said electrodes after the filling time and during a pumping time $t_p$ such that the ratio of the gas concentrations becomes substantially zero.

2. A gas analysis apparatus as claimed in claim 1, characterized in that the connecting means comprises a porous wall section of the measuring space wall means.

3. A gas analysis apparatus as claimed in claim 1, characterized in that the connecting means comprises at least one capillary element.

4. A gas analysis apparatus as claimed in claim 1, characterized in that the connecting means comprises a semipermeable membrane.

5. A gas analysis apparatus as claimed in claim 4, characterized in that the semipermeable membrane is made of the same solid substance of which the said partition is made, and that the electrode layers on opposite sides of the partition are interconnected.

6. A gas analysis apparatus as claimed in claim 1 wherein the control unit includes a charge measuring apparatus for measuring the charge supplied by the control unit during the pumping time interval $t_p$ and further includes a detection circuit, which is connected to an electrode layer, both at the one side and at the other side of the partition, and which for a specific voltage variation between these electrode layers supplies a stop signal which indicates the end of the charge measurement.

7. A gas analysis apparatus as claimed in claim 6 further comprising a temperature measuring circuits which measures the temperature T in degrees Kelvin in the measuring space and corrects the charge measurement of the charge measuring apparatus at least in the operating temperature range of the measuring space by a factor of 1/T.

8. A gas analysis apparatus as claimed in claim 6 further comprising means for varying the measuring space volume as a function of temperature so that the volume of the measuring space, at least in the operating temperature range, is proportional to the measuring space absolute temperature T in degrees Kelvin.

9. A gas analysis apparatus as claimed in claim 6 wherein the charge measuring apparatus includes a current source circuit which supplies said electric current, and a time measuring circuit which measures the time interval $t_p$, as a measure of the concentration of the gaseous component, from the time that the current is applied to the electrode layers until the detection circuit supplies the stop signal.

10. A gas analysis apparatus as claimed in claim 6 wherein the charge measuring apparatus includes a pulse source which supplies the electric current in the form of pulses with a known charge, and includes a counting circuit, which during the time interval $t_p$ counts the number of pulses from the pulse source as a measure of the concentration of the gaseous component.

11. A gas analysis apparatus as claimed in claim 6 wherein the detection circuit includes a differentiator which differentiates the specific voltage variation on said electrode layers and derives the stop signal from the pulse-shaped signal thus obtained.

12. A gas analysis apparatus as claimed in claim 6 wherein the control unit and the detection circuit are connected to the same electrode layers and that the detection circuit includes a compensator, which compensates for the voltage drop IR across the electrode layers during the time interval $t_p$ for a level detector, and supplies the stop signal when the specific voltage variation exceeds a reference level.

13. A gas analyser for determining the concentration of gaseous components in the exhaust gases of a combustion engine by means of a gas analysis apparatus as claimed in claim 1 wherein the first space forms part of the exhaust system of the combustion engine and at least the wall section with the partition of the measuring space is in contact with the exhaust gases.

14. A gas analysis apparatus for measuring the concentration of a gas component in a gas mixture located within a first space comprising, a chamber having wall sections that define a measuring space for receiving a gas sample from the first space during a first time interval, means for coupling the first space to the measuring space that includes a member having a high gas flow transfer resistance chosen so that the gas diffusion rate from the first space to the measuring space allows the concentration ratio of the said gas component in said two spaces to achieve a substantially unity value within the first time interval, said chamber including a wall section with a partition comprising a solid substance capable of ionic conduction and with first and second electrode means affixed to opposite sides of the partition, control means coupled to said first and second electrode means for applying an electric current thereto during a second time interval that is substantially shorter than said first time interval whereby the gas component is substantially completely removed from the measuring space via ionic conduction in said partition, said control means including means for interrupting the flow of current to said first and second electrode means during said first time interval.

15. A gas analysis apparatus as claimed in claim 14 wherein said control means includes a source of electric current for said first and second electrode means and detection means connected to said first and second electrode means and responsive to an electric signal developed thereat for causing the control means to interrupt the flow of electric current from said current source to said first and second electrode means when the gas component is substantially completely removed from the measuring space thereby terminating the second time interval, and said control means includes means for measuring the electric charge transferred during the second time interval.

16. A gas analysis apparatus as claimed in claim 15 further comprising means for deriving a control signal determined by the temperature of the measuring space, and means for applying said control signal to the control means for adjusting the electric charge measuring means such that the charge measurement is inversely proportional to said temperature.

* * * * *